United States Patent
Huang

(10) Patent No.: US 7,637,465 B2
(45) Date of Patent: Dec. 29, 2009

(54) MOUNTING DEVICE FOR HANGING AN ELECTRONIC DEVICE ON A WALL

(76) Inventor: Tom Huang, 27F-3, No. 26, Lane 28, Lung-An Rd., Hsi-Chih City, Taipei Hsien (TW)

( * ) Notice: Subject to any disclaimer, the term of this patent is extended or adjusted under 35 U.S.C. 154(b) by 424 days.

(21) Appl. No.: 11/566,806

(22) Filed: Dec. 5, 2006

(65) Prior Publication Data
US 2007/0251893 A1 Nov. 1, 2007

(30) Foreign Application Priority Data
Apr. 19, 2006 (TW) .............................. 95206623 U

(51) Int. Cl.
*F21V 35/00* (2006.01)
(52) U.S. Cl. ............... 248/222.13; 248/215; 248/298.1; 248/917; 403/321; 403/325
(58) Field of Classification Search ............ 248/222.13, 248/917, 214, 225.21, 298.1, 215; 361/729–735, 361/809, 823, 668, 679; 403/13, 24, 25, 403/254, 325, 49, 321, 322.1, 324, 326–328; 439/532, 716; 211/26, 192, 94.01; 292/32, 292/33, 42
See application file for complete search history.

(56) References Cited

U.S. PATENT DOCUMENTS

| | | | | |
|---|---|---|---|---|
| 846,022 A | * | 3/1907 | Ficener ........................... 4/647 |
| 4,165,852 A | * | 8/1979 | Chervenak ............. 248/223.41 |
| 4,228,906 A | * | 10/1980 | Jones ....................... 211/88.01 |
| 4,752,107 A | * | 6/1988 | Gunell et al. ............... 439/709 |
| 4,826,115 A | * | 5/1989 | Novitski .................. 248/224.8 |
| 5,259,787 A | * | 11/1993 | Byrne ........................ 439/532 |
| 5,308,031 A | * | 5/1994 | Evenson ................ 248/222.13 |
| 6,752,653 B1 | * | 6/2004 | Morlock et al. ............. 439/527 |

* cited by examiner

*Primary Examiner*—Korie Chan
(74) *Attorney, Agent, or Firm*—Whyte Hirschboeck Dudek SC

(57) ABSTRACT

A mounting device includes a fixed bracket unit, a detachable bracket unit, and a safety lock. The fixed bracket unit is mounted on a wall. The detachable bracket unit is fastened to an electronic device, is formed with an engaging groove, and is suspended on the fixed bracket unit. The safety lock is coupled movably to the fixed bracket unit, and is movable relative to the fixed bracket unit between an engaged position, where the safety lock extends into the engaging groove in the detachable bracket unit, and a disengaged position, where the safety lock disengages the engaging groove in the detachable bracket unit.

5 Claims, 9 Drawing Sheets

MOUNTING DEVICE FOR HANGING AN ELECTRONIC DEVICE ON A WALL

CROSS-REFERENCE TO RELATED APPLICATION

This application claims priority of Taiwanese application no. 095206623, filed on Apr. 19, 2006.

BACKGROUND OF THE INVENTION

1. Field of the Invention

This invention relates to a mounting device, more particularly to a mounting device for hanging an electronic device on a wall.

2. Description of the Related Art

FIGS. 1 and 2 illustrate a conventional mounting device for mounting a liquid crystal display 1 on a wall 3. The conventional mounting device includes a fixed bracket unit 22, a detachable bracket unit 21, and a safety lock 23. The fixed bracket unit 22 is mounted securely on the wall 3 and is provided with an upper hook 221 and a lower inverted hook 222. The detachable bracket unit 21 includes a pair of brackets, each of which is provided with an upper inverted hook 211 and a lower hook 212, and is suspended on the fixed bracket unit 22 such that the upper inverted hook 211 and the lower hook 212 of each of the brackets of the detachable bracket unit 21 respectively engage the upper hook 221 and the lower inverted hook 222 of the fixed bracket unit 22. The safety lock 23 is inserted into a gap between the lower hook 212 of each of the brackets of the detachable bracket unit 21 and the lower inverted hook 222 of the fixed bracket unit 22 to thereby prevent movement of the detachable bracket unit 21 relative to the fixed bracket unit 22.

The aforementioned conventional mounting device is disadvantageous in that insertion of the safety lock 23 is not possible to perform when the mounting device is to be disposed in a recess, which has a shape that corresponds to the liquid crystal display 1, in a wall.

SUMMARY OF THE INVENTION

Therefore, the object of the present invention is to provide a mounting device that can overcome the aforesaid drawback of the prior art.

According to the present invention, a mounting device comprises a fixed bracket unit, a detachable bracket unit, and a safety lock. The fixed bracket unit is adapted to be mounted on a wall, and is provided with upper and lower hooks. The detachable bracket unit is adapted to be fastened to an electronic device, is provided with upper and lower inverted hooks, is formed with an engaging groove, and is suspended on the fixed bracket unit such that the upper and lower inverted hooks engage respectively the upper and lower hooks. The safety lock is coupled movably to the fixed bracket unit, and is movable relative to the fixed bracket unit between an engaged position, where the safety lock extends into the engaging groove in the detachable bracket unit when the detachable bracket unit is suspended on the fixed bracket unit, thereby preventing upward movement of the detachable bracket unit relative to the fixed bracket unit, and a disengaged position, where the safety lock disengages the engaging groove in the detachable bracket unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
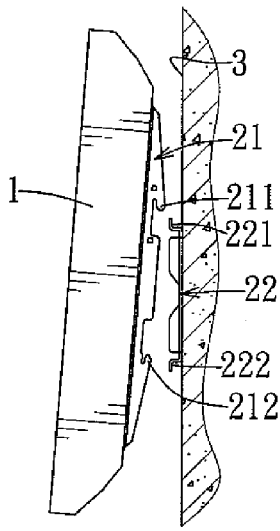
FIG. 1 is a schematic view of a conventional mounting device in a state of use.
Figure 2:
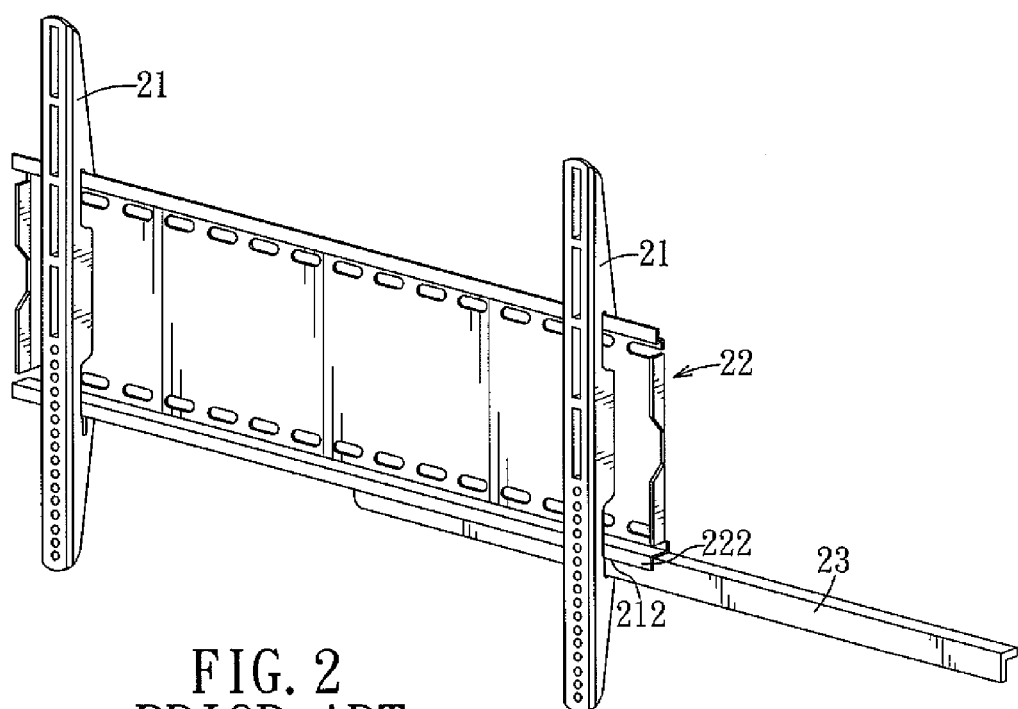
FIG. 2 is a perspective view to illustrate usage of a safety lock of the conventional mounting device.

Before the present invention is described in greater detail, it should be noted that like elements are denoted by the same reference numerals throughout the disclosure.

Figure 3:
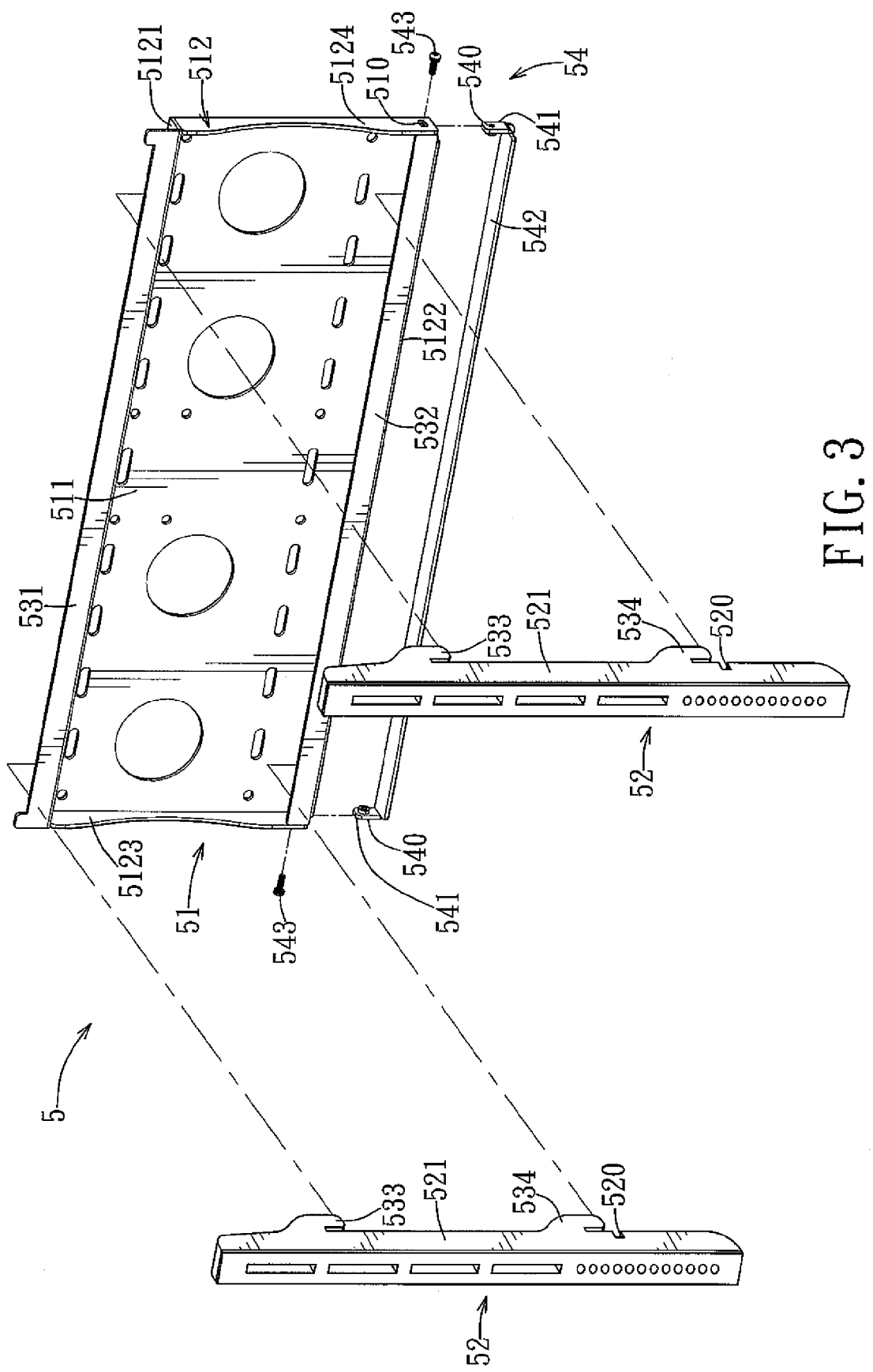
FIG. 3 is an exploded perspective view of the first preferred embodiment of a mounting device according to the present invention.
Figure 4:
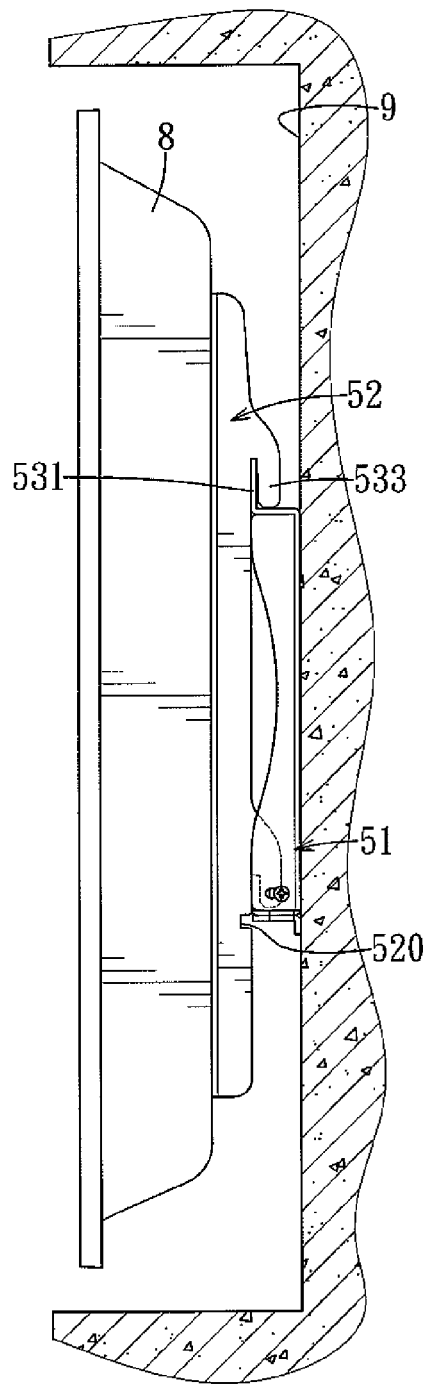
FIGS. 4 and 5 are partly sectional views to illustrate a state where a safety lock of the first preferred embodiment is disposed at disengaged and engaged positions, respectively.
Figure 5:
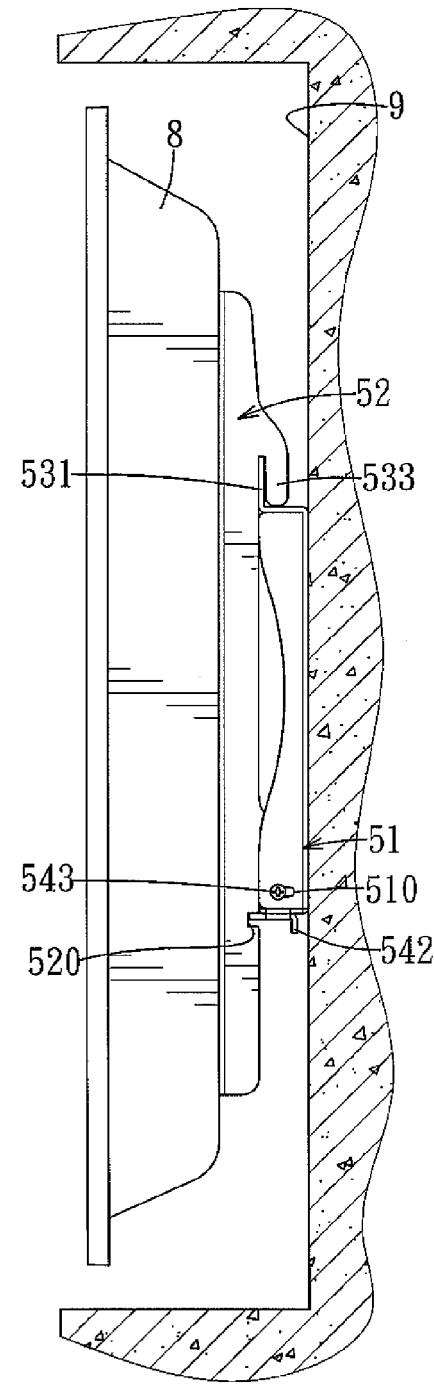

Referring to FIGS. 3 to 5, the first preferred embodiment of a mounting device 5 according to this invention is shown to include a fixed bracket unit 51, a detachable bracket unit 52, and a safety lock 54.

The mounting device 5 of this embodiment is used for hanging an electronic device 8, such as a liquid crystal display, on a wall 9, in a manner that will be described hereinafter.

The fixed bracket unit 51 includes a vertical member 511 that is generally rectangular in shape, and a surrounding member 512 that extends transversely from a periphery of the vertical member 511 of the fixed bracket unit 51 and that has top, bottom, left and right segments 5121, 5122, 5123, 5124. In this embodiment, the fixed bracket unit 51 is provided with upper and lower hooks 531, 532, each of which extends transversely from a respective one of the top and bottom segments 5121, 5122 of the surrounding member 512 of the fixed bracket unit 51.

The detachable bracket unit 52 includes a pair of brackets 521, each of which is provided with upper and lower inverted hooks 533, 534, and is suspended on the fixed bracket unit 51 such that the upper and lower inverted hooks 533, 534 of each of the brackets 521 of the detachable bracket unit 52 engage respectively the upper and lower hooks 531, 532 of the fixed bracket unit 51, as best shown in FIG. 4.

From the above description, when it is desired to hang the electronic device 8 on the wall 9, the vertical member 511 of the fixed bracket unit 51 is first mounted on the wall 9. The brackets 521 of the detachable bracket unit 52 are then fastened to the electronic device 8. Thereafter, the detachable bracket unit 52 is suspended on the fixed bracket unit 51. At this time, when it is desired to detach the detachable bracket unit 52 from the fixed bracket unit 51, the detachable bracket unit 52 is moved upwardly relative to the fixed bracket unit 51 such that the upper and lower inverted hooks 533, 534 of each of the brackets 521 of the detachable bracket unit 52 disengage respectively the upper and lower hooks 531, 532 of the fixed bracket unit 51.

The safety lock 54 is coupled movably to the fixed bracket unit 51. In particular, the safety lock 54 is generally U-shaped, and includes a horizontal member 542 and a pair of vertical members 541. Each of the left and right segments 5123, 5124 of the surrounding member 512 of the fixed bracket unit 51 is formed with an elongated through-hole 510 that extends in a horizontal direction. Each of the vertical members 541 of the safety lock 54 is formed with a threaded through-hole 540. The mounting device 5 further includes a pair of screw fasteners 543, each of which threadedly engages the threaded through-hole 540 in a respective one of the vertical members 541 of the safety lock 54, and extends movably through the elongated through-hole 510 in a respective one of the left and right segments 5123, 5124 of the surrounding member 512 of the fixed bracket unit 51, thereby coupling movably the safety lock 54 to the fixed bracket unit 51.

The safety lock 54 serves to prevent upward movement of the detachable bracket unit 52 relative to the fixed bracket unit 51 when the detachable bracket unit 52 is suspended on the fixed bracket unit 51. In particular, each of the brackets 521 of the detachable bracket unit 52 is formed with an engaging groove 520 that is disposed below the lower inverted hook 534 of a respective one of the brackets 521 of the detachable bracket unit 52. The safety lock 54 is movable relative to the fixed bracket unit 51 in the horizontal direction between an engaged position, where the horizontal member 542 of the safety lock 54 extends into the engaging grooves 520 in the brackets 521 of the detachable bracket unit 52 when the detachable bracket unit 52 is suspended on the fixed bracket unit 51, thereby preventing upward movement of the detachable bracket unit 52 relative to the fixed bracket unit 51, as best shown in FIG. 5, and a disengaged position, where the horizontal member 542 of the safety lock 54 disengages the engaging grooves 520 in the brackets 521 of the detachable bracket unit 52, as best shown in FIG. 4.

Figure 6:
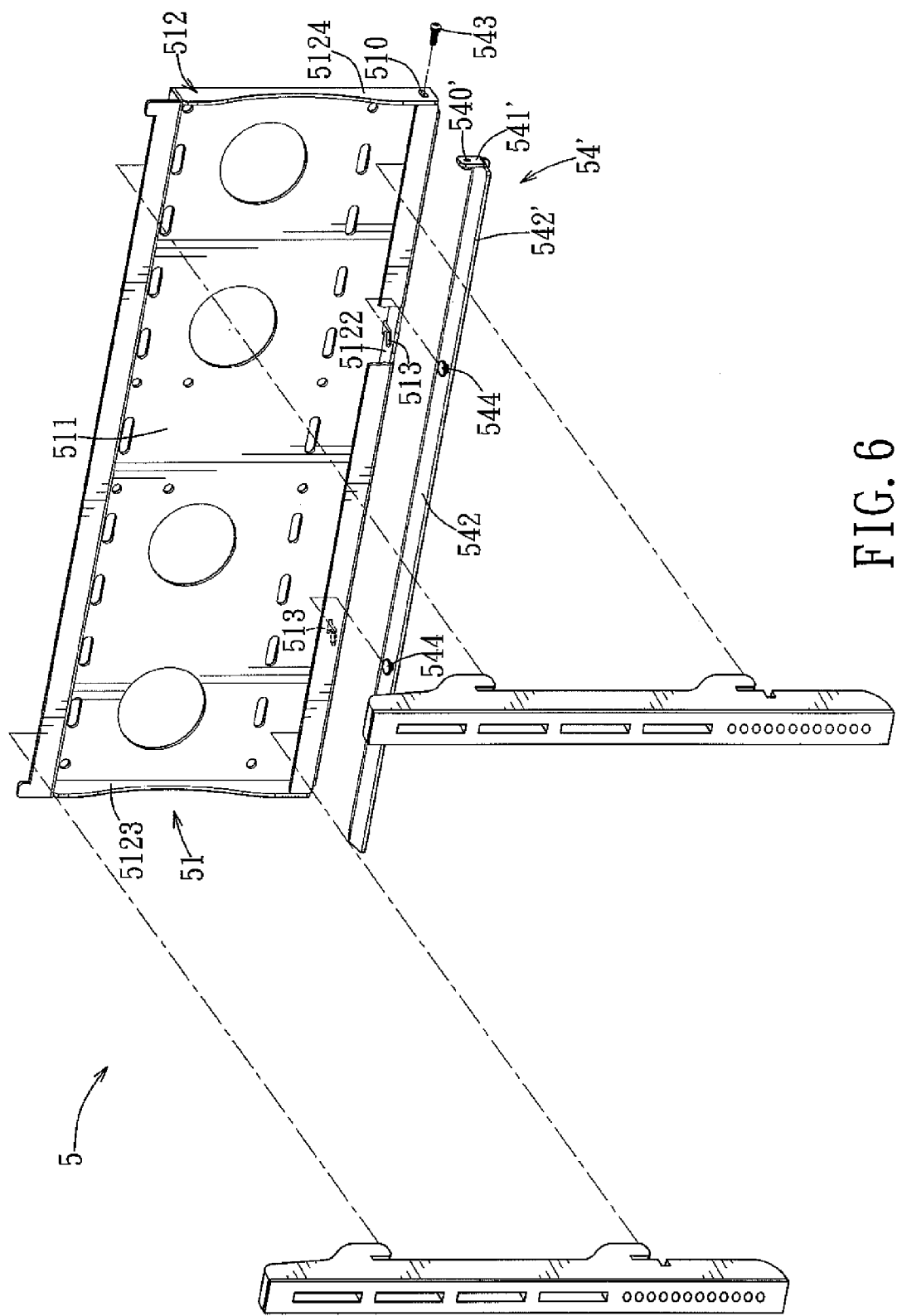
FIG. 6 is an exploded perspective view of the second preferred embodiment of a mounting device according to the present invention.

FIG. 6 illustrates the second preferred embodiment of a mounting device 5 according to this invention. When compared to the previous embodiment, the left segment 5123 of the surrounding member 512 of the fixed bracket unit 51 is dispensed with the elongated through-hole 510. The safety lock 54' is L-shaped, and includes vertical and horizontal members 541', 542'. The vertical member 541' of the safety lock 54' is formed with a threaded through-hole 540'. The screw fastener 543 threadedly engages the threaded through-hole 540' in the vertical member 541' of the safety lock 54', and extends movably through the elongated through-hole 510 in the right segment 5124 of the surrounding member 512 of the fixed bracket unit 51, thereby coupling movably the safety lock 54' to the fixed bracket unit 51.

Figure 7:
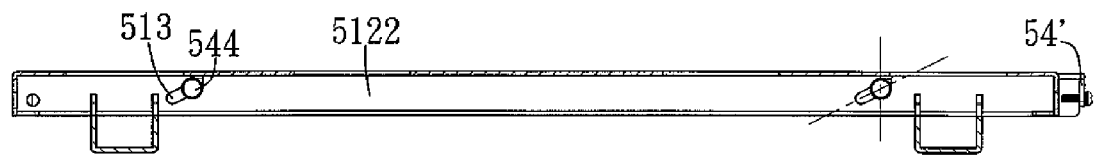
FIG. 7 is a sectional top view to illustrate a state where a safety lock of the second preferred embodiment is disposed at a disengaged position.

The mounting device 5 further includes a guide unit for guiding movement of the safety lock 54' between the engaged and disengaged positions. The bottom segment 5122 of the surrounding member 512 of the fixed bracket unit 51 is formed with a pair of elongated through-holes 513, each of which extends inclinedly with respect to the vertical member 511 of the fixed bracket unit 51 and has opposite first and second ends, as best shown in FIG. 7. The guide unit includes a pair of protrusions 544, each of which is provided on the horizontal member 542' of the safety lock 54' and each of which extends through a respective one of the elongated through-holes 513 in the bottom segment 5122 of the surrounding member 512 of the fixed bracket unit 51.

Figure 8:
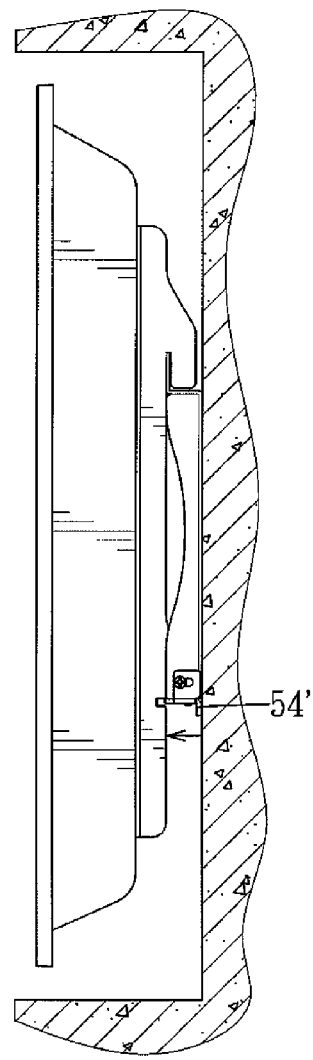
FIG. 8 is a partly sectional side view to illustrate the state where the safety lock of the second preferred embodiment is disposed at the disengaged position.
Figure 9:
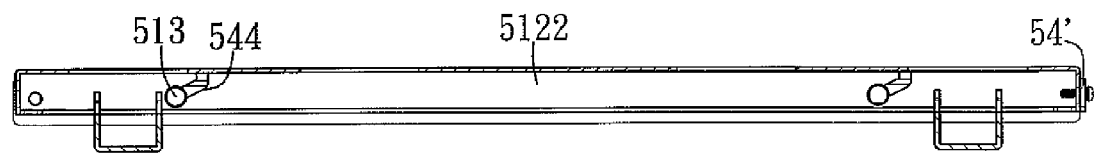
FIG. 9 is a sectional top view to illustrate a state where the safety lock of the second preferred embodiment is disposed at an engaged position.
Figure 10:
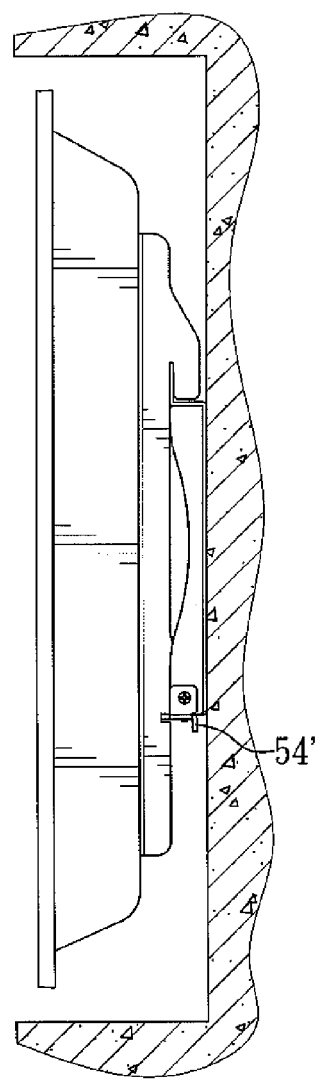
FIG. 10 is a partly sectional side view to illustrate the state where the safety lock of the second preferred embodiment is disposed at the engaged position.

With further reference to FIG. 8, each of the protrusions 544 is disposed at the first end of the respective one of the elongated through-holes 513 in the bottom segment 5122 of the surrounding member 512 of the fixed bracket unit 51 when the safety lock 54' is disposed at the disengaged position. Furthermore, with further reference to FIGS. 9 and 10, each of the protrusions 544 is disposed at the second end of the respective one of the elongated through-holes 513 in the bottom segment 5122 of the surrounding member 512 of the fixed bracket unit 51 when the safety lock 54' is disposed at the engaged position.

Figure 11:
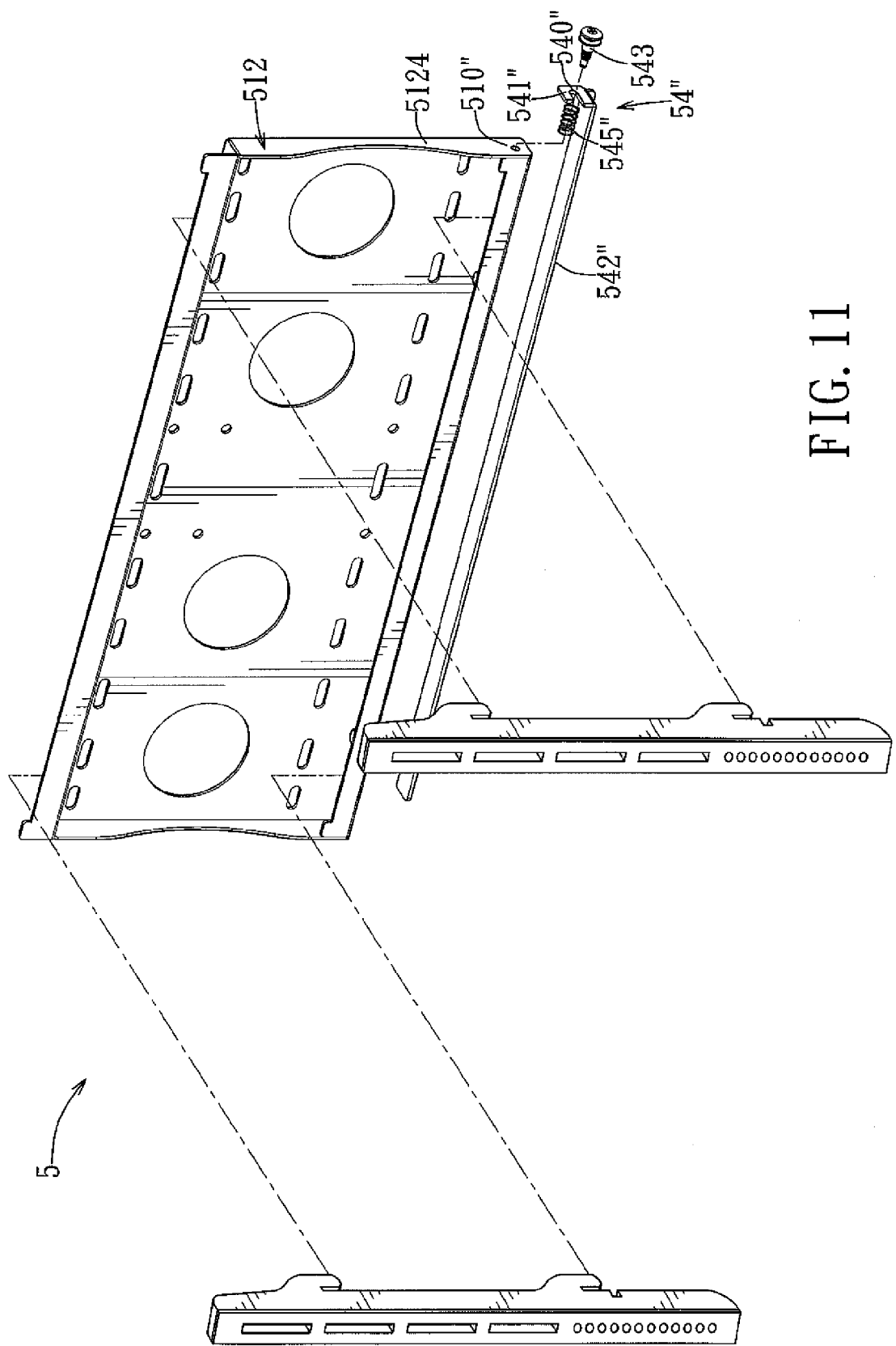
FIG. 11 is an exploded perspective view of the third preferred embodiment of a mounting device according to the present invention.
Figure 12:
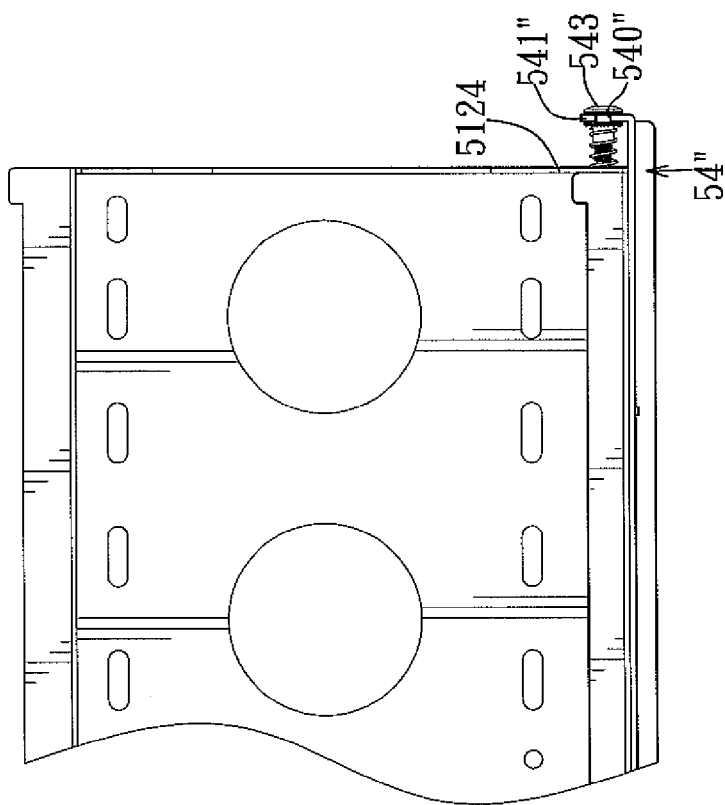

FIGS. 11 and 12 illustrate the third preferred embodiment of a mounting device 5 according to the present invention. When compared with the second preferred embodiment, instead of the elongated through-hole 510 (see FIG. 6), the right segment 5124 of the surrounding member 512 of the fixed bracket unit 51 is formed with a threaded through-hole 510".

The vertical member 541" of the safety lock 54" is formed with an elongated notch 540" that extends in the horizontal direction. The screw fastener 543 extends through the elongated notch 540" in the vertical member 541" of the safety lock 54", and engages threadedly the threaded through-hole 510" in the right segment 5124 of the surrounding member 512 of the fixed bracket unit 51, thereby coupling movably the safety lock 54" to the fixed bracket unit 51.

The mounting device 5 further includes a biasing spring 545" that is sleeved on the screw fastener 543, that is disposed between the right segment 5124 of the surrounding member 512 of the fixed bracket unit 51 and the vertical member 541" of the safety lock 54", and that has opposite ends abutting respectively against the right segment 5124 of the surrounding member 512 of the fixed bracket unit 51 and the vertical member 541" of the safety lock 54".

Figure 13:
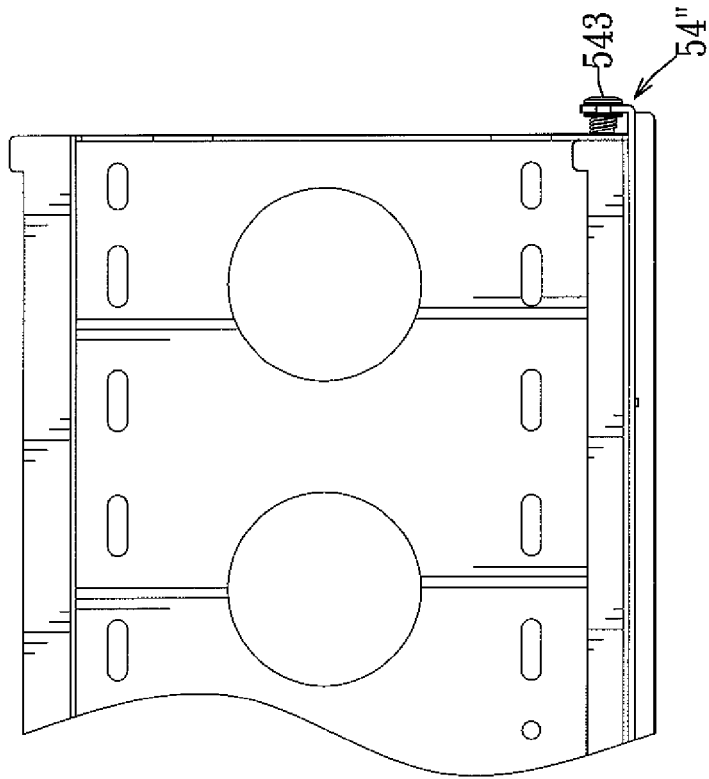
FIGS. 12 and 13 are fragmentary schematic views to illustrate a screw fastener of the third preferred embodiment disposed in loosened and tightened states, respectively.
Figure 15:
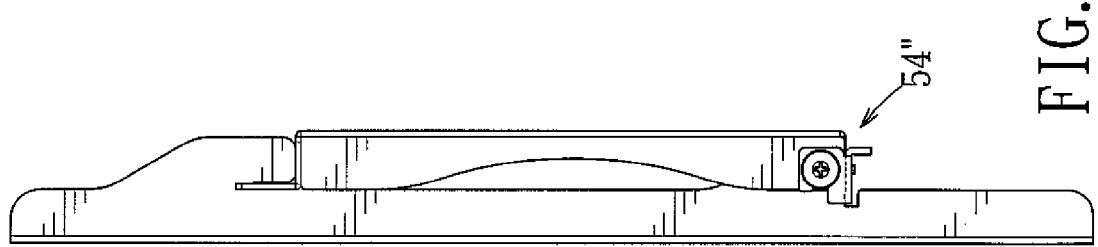
FIGS. 14 and 15 are fragmentary schematic views to illustrate the safety lock of the third preferred embodiment disposed at the disengaged and engaged positions, respectively.
Figure 14:
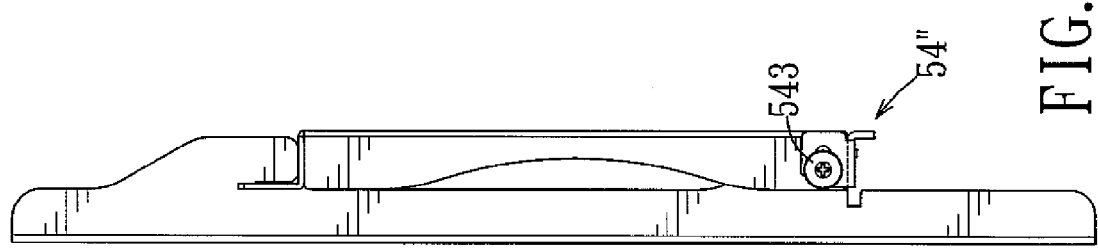

In use, when it is desired to move the safety lock 54" from the disengaged position, as best shown in FIG. 14, the screw fastener 543 is first loosened, as best shown in FIG. 12. At this time, the safety lock 54" may be easily disposed at the engaged position, as best shown in FIG. 15. Thereafter, the screw fastener 543 is tightened once again, as best shown in FIG. 13.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A mounting device, comprising:
a fixed bracket unit adapted to be mounted on a wall, provided with upper and lower hooks, and including a vertical member, and a surrounding member that extends transversely from a periphery of said vertical member, and that has right and bottom segments, each of which is formed with an elongated through-hole;
a detachable bracket unit adapted to be fastened to an electronic device, provided with upper and lower inverted hooks, formed with an engaging groove, and suspended on said fixed bracket unit such that said upper and lower inverted hooks engage respectively said upper and lower hooks;
a generally L-shaped safety lock including a horizontal member, and a vertical member formed with a threaded through-hole, and coupled movably to said fixed bracket unit, said safety lock being movable relative to said fixed bracket unit between an engaged position, where said safety lock extends into said engaging groove in said detachable bracket unit when said detachable bracket unit is suspended on said fixed bracket unit, thereby preventing upward movement of said detachable bracket unit relative to said fixed bracket unit, and a disengaged position, where said safety lock disengages said engaging groove in said detachable bracket unit;
a screw fastener engaging threadedly said threaded through-hole in said vertical member of said safety lock, and extending movably through said elongated through-hole in said right segment of said surrounding member of said fixed bracket unit, thereby coupling movably said safety lock to said fixed bracket unit; and
a guide unit for guiding movement of said safety lock between the engaged and disengaged positions, said guide unit including a protrusion that is provided on said horizontal member of said safety lock and that extends through said elongated through-hole in said bottom segment of said surrounding member of said fixed bracket unit.

2. The mounting device as claimed in claim 1, wherein said elongated through-hole in said bottom segment of said surrounding member of said fixed bracket unit extends inclinedly with respect to said vertical member of said fixed bracket unit.

3. A mounting device, comprising:
a fixed bracket unit adapted to be mounted on a wall, provided with upper and lower hooks, and including a vertical member, and a surrounding member that extends transversely from a periphery of said vertical member and that has top and bottom segments, each of said upper and lower hooks extending from a respective one of said top and bottom segments of said surrounding member of said fixed bracket unit;
a detachable bracket unit adapted to be fastened to an electronic device, provided with upper and lower inverted hooks, formed with an engaging groove, and suspended on said fixed bracket unit such that said upper and lower inverted hooks engage respectively said upper and lower hooks; and
a safety lock coupled movably to said fixed bracket unit, said safety lock being movable relative to said fixed bracket unit between an engaged position, where said safety lock extends into said engaging groove in said detachable bracket unit when said detachable bracket unit is suspended on said fixed bracket unit, thereby preventing upward movement of said detachable bracket unit relative to said fixed bracket unit, and a disengaged position, where said safety lock disengages said engaging groove in said detachable bracket unit.

4. A mounting device, comprising:
a fixed bracket unit adapted to be mounted on a wall, provided with upper and lower hooks, and including a vertical member, and a surrounding member that extends transversely from a periphery of said vertical member and that has opposite left and right segments, each of which is formed with an elongated through-hole;
a detachable bracket unit adapted to be fastened to an electronic device, provided with upper and lower inverted hooks, formed with an engaging groove, and suspended on said fixed bracket unit such that said upper and lower inverted hooks engage respectively said upper and lower hooks;
a generally U-shaped safety lock including a pair of vertical members, each of which is formed with a threaded through-hole, and coupled movably to said fixed bracket unit, said safety lock being movable relative to said fixed bracket unit between an engaged position, where said safety lock extends into said engaging groove in said detachable bracket unit when said detachable bracket unit is suspended on said fixed bracket unit, thereby preventing upward movement of said detachable bracket unit relative to said fixed bracket unit, and a disengaged position, where said safety lock disengages said engaging groove in said detachable bracket unit; and
a pair of screw fasteners, each of which engages threadedly said threaded through-hole in a respective one of said vertical members of said safety lock, and each of which extends movably through said elongated through-hole in a respective one of said left and right segments of said surrounding member of said fixed bracket unit, thereby coupling movably said safety lock to said fixed bracket unit.

5. A mounting device, comprising:
a fixed bracket unit adapted to be mounted on a wall, provided with upper and lower hooks, and including a vertical member that is generally rectangular in shape, and a surrounding member that extends transversely from a periphery of said vertical member, and that has a right segment formed with a threaded through-hole;
a detachable bracket unit adapted to be fastened to an electronic device, provided with upper and lower inverted hooks, formed with an engaging groove, and suspended on said fixed bracket unit such that said upper and lower inverted hooks engage respectively said upper and lower hooks;
a generally L-shaped safety lock including a horizontal member, and a vertical member formed with an elongated notch, and coupled movably to said fixed bracket unit, said safety lock being movable relative to said fixed bracket unit between an engaged position, where said safety lock extends into said engaging groove in said detachable bracket unit when said detachable bracket unit is suspended on said fixed bracket unit, thereby preventing upward movement of said detachable bracket unit relative to said fixed bracket unit, and a disengaged position, where said safety lock disengages said engaging groove in said detachable bracket unit;
a screw fastener extending movably through said elongated notch in said vertical member of said safety lock, and engaging threadedly said threaded through-hole in said right segment of said surrounding member of said fixed bracket unit, thereby coupling movably said safety lock to said fixed bracket unit; and a biasing spring sleeved on said screw fastener, disposed between said right segment of said surrounding member of said fixed bracket unit and said vertical member of said safety lock, and having opposite ends abutting respectively against said right segment of said surrounding member of said fixed bracket unit and said vertical member of said safety lock.

* * * * *